(12) United States Patent
Sondur

(10) Patent No.: US 6,987,482 B2
(45) Date of Patent: Jan. 17, 2006

(54) WIRELESS SIGNAL PROCESSING METHODS AND APPARATUSES INCLUDING DIRECTIONS OF ARRIVAL ESTIMATION

(75) Inventor: Lakshmipathi Sondur, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 10/666,509

(22) Filed: Sep. 19, 2003

(65) Prior Publication Data

US 2005/0062646 A1 Mar. 24, 2005

(51) Int. Cl.
*H01Q 3/00* (2006.01)
*G01S 5/02* (2006.01)

(52) U.S. Cl. ...................... 342/377; 342/417

(58) Field of Classification Search ............. 342/377, 342/417
See application file for complete search history.

(56) References Cited

U.S. PATENT DOCUMENTS

| | | | | |
|---|---|---|---|---|
| 4,965,732 A | * | 10/1990 | Roy et al. ............. | 342/147 |
| 2002/0122472 A1 | | 9/2002 | Lay | |

FOREIGN PATENT DOCUMENTS

EP      1 335 504 A2      8/2003

OTHER PUBLICATIONS

H. Krim et al., Two decades of array signal processing research: the parametric approach, IEEE Signal Processing Magazine, vol. 13 (4), p. 67–94, Jul. 1996.*
M.C. Vanderveen et al., Joint angle and delay estimation (JADE) for signals in multipath environment, Conference Record of th Thirtieth Asilomar Conference on Signals, Systems and Computers, p. 1250–1254, Nov. 1996.*
A.J. Paulraj et al., Space–time processing for wireless communications, IEEE Signal Processing Magazine, vol. 14(6), p. 49–83 Nov. 1997.*
F. Edman, Implementation Aspects of Algorithms for Adaptive Antennas, Master of Science Thesis in Electrical Engineering, Department of Applied Electronics, p. 1–4, 23–34, Jun. 1999.*
Ermolaev, et al., "Fast Algorithm for Minimum–Norm Direction–of–Arrival Estimation," IEEE Transactions on Signal Processing, vol. 42, No. 9, Sep. 1994, pp. 2389–2394.

(Continued)

*Primary Examiner*—Thomas H. Tarcza
*Assistant Examiner*—Fred H Mull
(74) *Attorney, Agent, or Firm*—Schwabe, Williamson & Wyatt, P.C.

(57) ABSTRACT

A DOA estimation unit is provided with at least one of two DOA estimation techniques to determine the DOA of signals wireless transmitted. A first technique includes determination of the DOA based at least in part on a relationship between a received signal vector and a number of signal directional vectors. The second technique includes determination of the DOAs of the L multipaths of a signal by searching in a direction range centered on a determined DOA of the signal.

22 Claims, 4 Drawing Sheets

Figure 3

OTHER PUBLICATIONS

Roy, et al., "ESPRIT—A Subspace Rotation Approach to Estimation of Parameters of Cisoids in Noise," IEEE Transactions on Acoustics, Speech, and Signal Processing, vol. ASSP–34, No. 5, Oct. 1986, pp. 1340–1342.

Schmidt, "Multiple Emitter Location and Signal Parameter Estimation," IEEE Transactions on Antennas and Propagation, vol. AP–34, No. 3, Mar. 1986, pp. 276–280.

McCarthy, Frank, "Multiple Signal Direction–Finding and Interference Reduction Techniques," ARGOSystems, Inc., Wescon/93 Technical Conference, 1993.

Hernandez, Marco, A., et al., Subspace Based Estimation of Parameters and Linear Space–Time Multiuser Detection for WCDMA Systems, Delft University of Technology, IEEE 6th Int. Symp., Sep./2000.

* cited by examiner

WIRELESS SIGNAL PROCESSING METHODS AND APPARATUSES INCLUDING DIRECTIONS OF ARRIVAL ESTIMATION

TECHNICAL FIELD

The present invention is related to the field of communication in general, and wireless communication, in particular.

BACKGROUND

Advances in integrated circuit, microprocessor, networking, telecommunication and other related technologies have led to wide spread adoption of wireless communication, e.g. mobile wireless "cell" phones. In the case of wireless communication, such as mobile wireless "cell" phones, typically, a mobile wireless "cell" phone (also referred to as a mobile handset), communicates with a "nearby" service station (also referred to as a base station), which relays the communication signals for the mobile handset. The service/base station provides the relay service for all mobile handset in its coverage area (its "cell"). Thus, a service/base station typically receives and processes communication signals from a number of mobile handsets in its "cell" concurrently.

Use of multiple antennas at the service/base station for receiving the communication signals from the mobile handsets have become popular, as it has several advantages in terms of enhancing the capacity and throughput of the wireless communication system. Various signal processing techniques are employed to process the received communication signals, including but not limited to "space-time" processing techniques.

Among the space-time processing techniques, beamforming is one of the promising areas of interest for enhancing the strength of signals received from a desired direction. One known technique is the employment of a known training sequence to estimate the optimum weights (e.g. using least mean square (LMS)), for beamforming to a desirable direction. Other known techniques for estimating the directions of arrival (DOAs) include employment of the Bartlett processor or the MUSIC (Multiple Signal Classification) technique.

Training has the disadvantage of incurring overhead in the throughput of the system, and convergence may take longer time than the time available to make the determination. The latter techniques require a large number of snapshots of the received signals to provide a good estimate of a correlation matrix reflective of the correlation (or the lack thereof) of the received signals from the independent signal sources.

Additionally, while each communication signal typically has a number of multipaths, due to environmental factors, such as reflection off structures and so forth, these techniques typically estimate the DOA based only on the most dominant multipath of a signal.

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

Embodiments of the present invention include but are not limited to methods and apparatuses for determining the direction of arrivals of a number of signals wirelessly transmitted. Embodiments of the present invention also include methods and apparatuses for determining the direction of arrivals of multipaths of a number of signals wirelessly transmitted.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
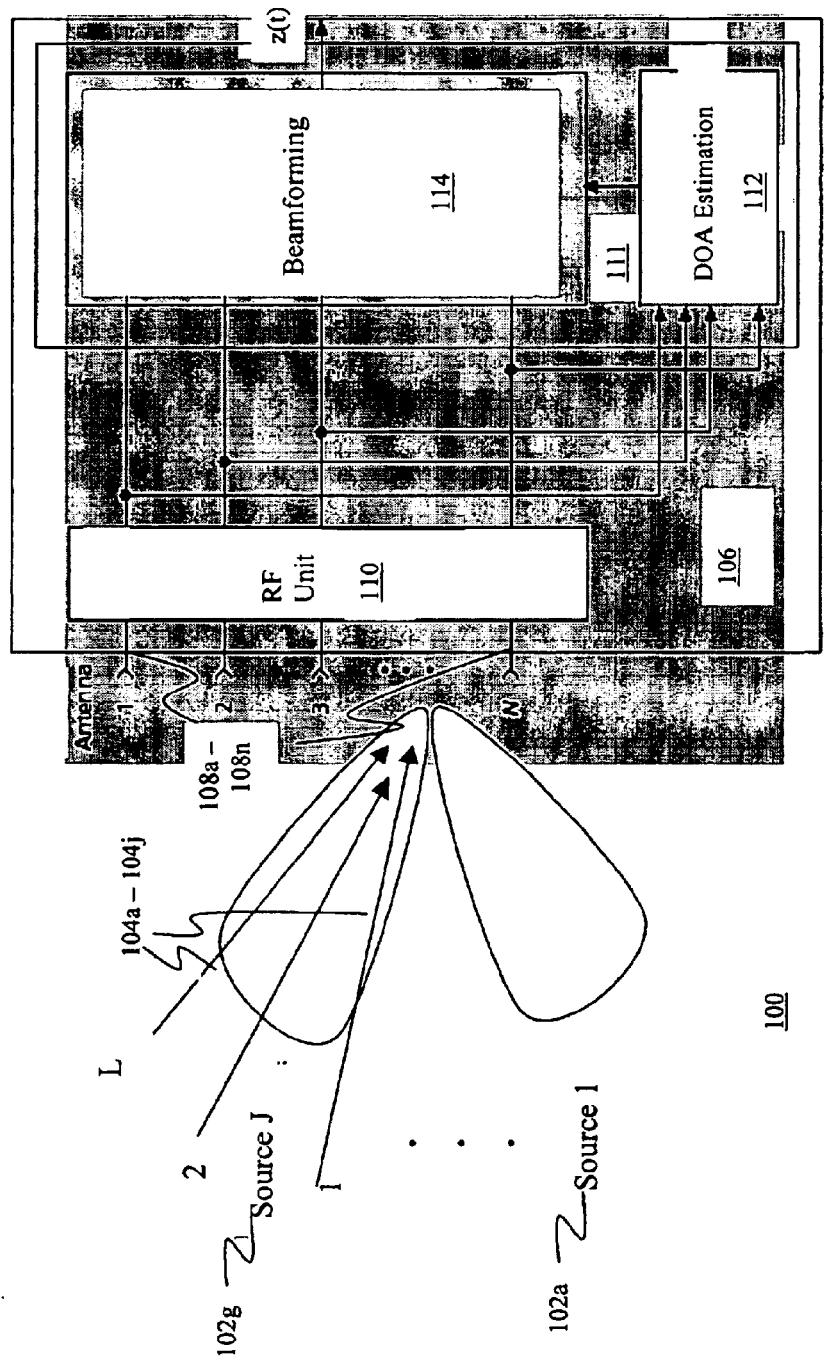
FIG. 1 illustrates a communication environment suitable for practicing the present invention, in accordance with one embodiment.

Referring now to FIG. 1 wherein an overview of a communication environment suitable for practicing the present invention, in accordance with one embodiment, is shown. As illustrated, for the embodiment, communication environment 100 includes J mobile handsets 102a–102j and base station 106, communicatively coupled to each other. Base station 106 relays communication signals for mobile handsets 102a–102j including receiving signals wirelessly transmitted by the handsets. The received signals, among other things, may be processed and forwarded to another signal processing node (not shown) of a wireless communication service network, to which base station 106 is coupled, and/or to a signal processing node (not shown) of a PSTN (Public Switched Telephone Network).

For the embodiment, base station 106 includes N antennas 108a–108n, RF unit 110, and signal processing unit 111, coupled to each other as shown (RF=Radio Frequency). Antennas 108a–108n are employed to transmit to, and receive signals from mobile handsets 102a–102j. Additionally, antennas 108a–108n may be employed for other purposes. Antennas 108a–108n may also be referred to as sensors. For the purpose of this application, the two terms are synonymous.

RF unit 110 is employed to down convert RF signals received by antennas 108a–108n into baseband signals, or up convert baseband signals into RF signals for transmission by antennas 108a–108n.

Signal processing unit 111 is employed to process the down converted baseband signals, and process outbound signals for up conversion. For the embodiment, signal processing unit 111, includes in particular DOA Estimation unit 112 and Beamforming unit 114, coupled to each other and to RF unit 110 as shown.

Figure 2:
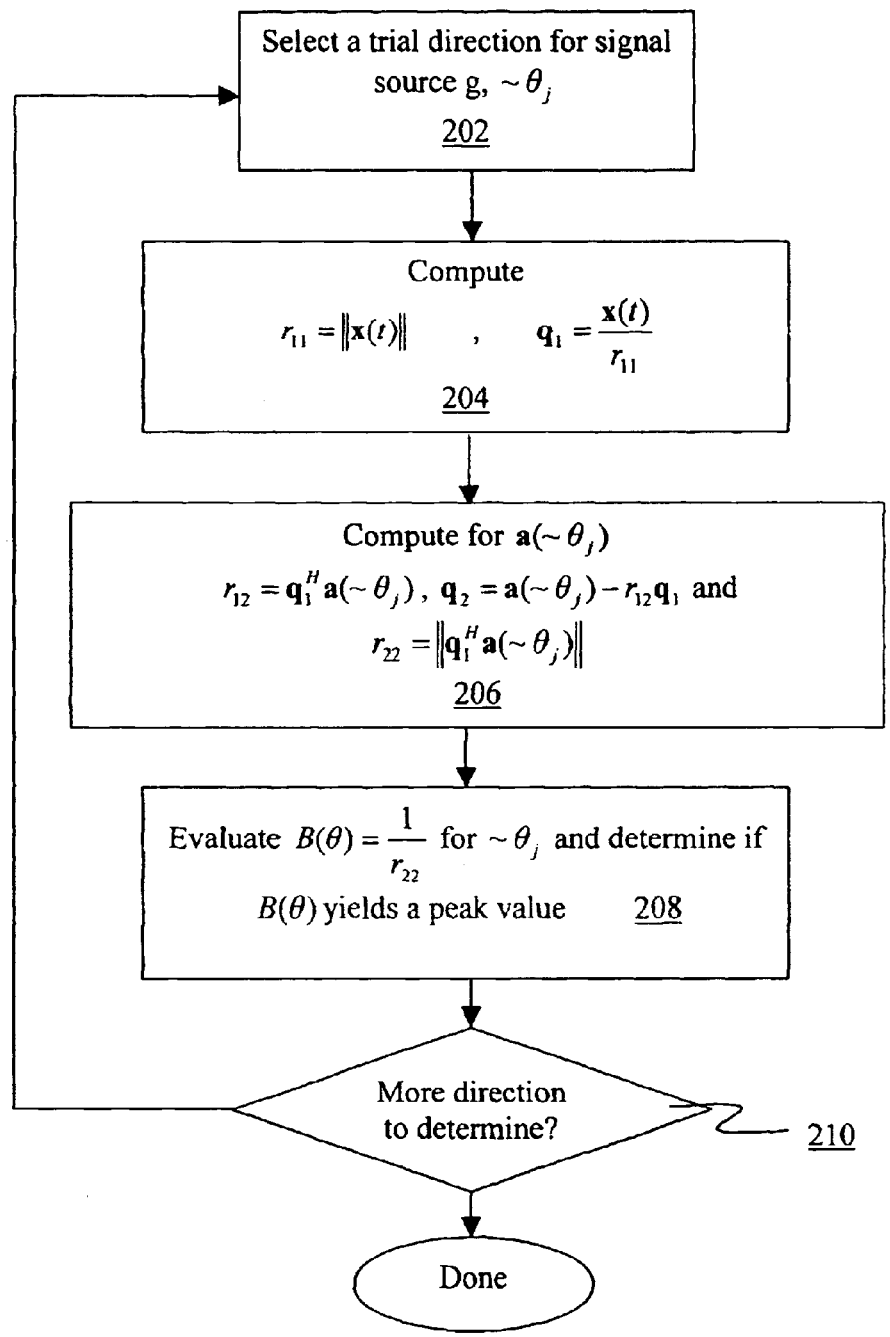
FIG. 2 illustrates a portion of the operational flow for determining the directions of arrival of J signals wirelessly transmitted from J signal sources, in accordance with one embodiment.

In various embodiments, DOA Estimation unit 112 estimates the DOAs of the J signals (J being an integer), to be described more fully before referencing FIG. 2. For these embodiments, Beamforming unit 114 forms the corresponding weighted output signals based at least in part on the DOAs of the J signals estimated by DOA Estimation unit 112.

Figure 3:
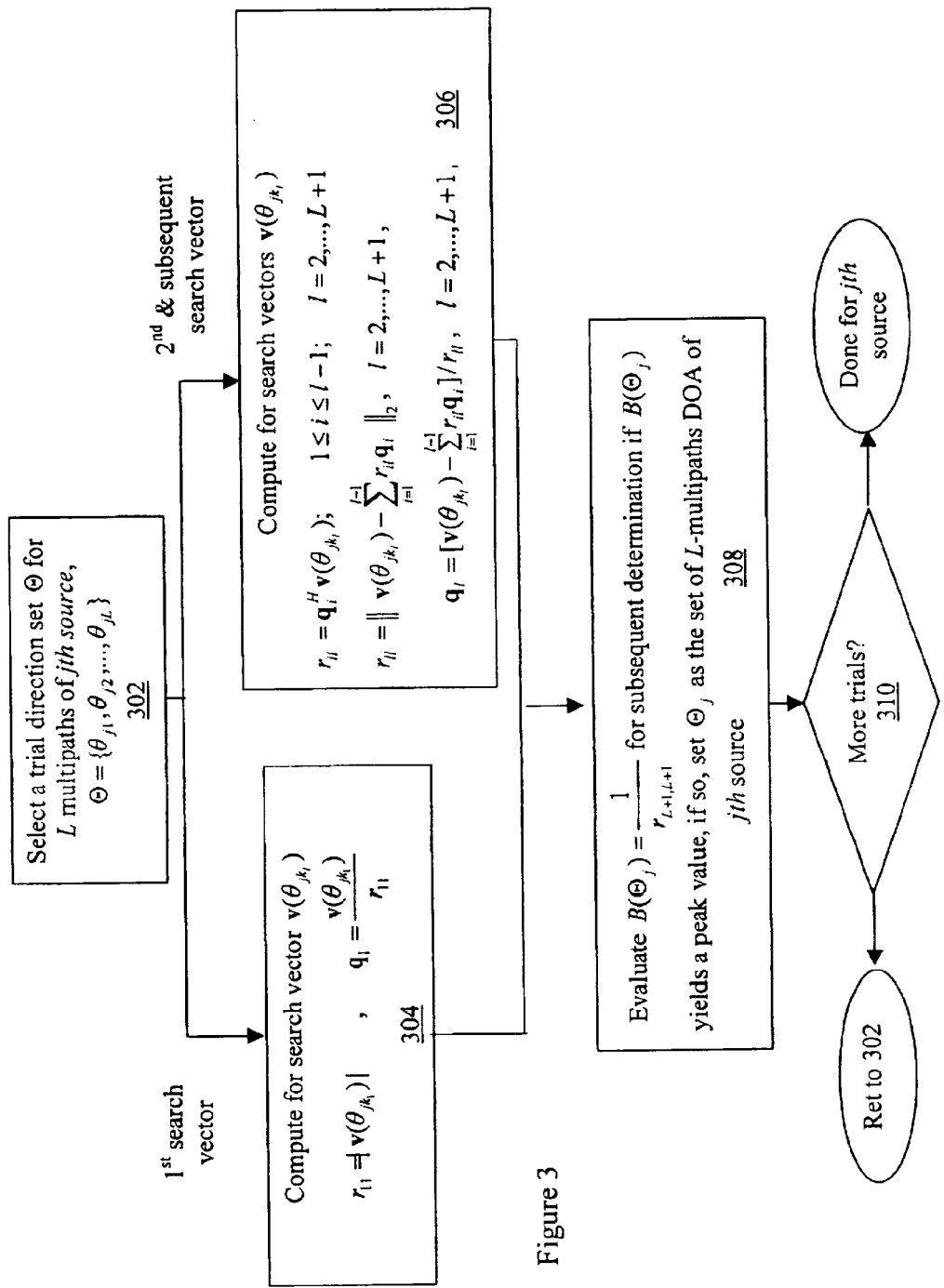
FIG. 3 illustrates a portion of the operational flow for determining the directions of arrival of L multipaths of J signals wirelessly transmitted from J signal sources, in accordance with one embodiment.

In other embodiments, DOA Estimation unit 112 estimates the DOAs of the L multipaths (L being an integer) of the J signals, to be described more fully referencing FIG. 3. Some embodiments support one of the two methods to be described referencing FIGS. 2 and 3. Other embodiments support both. For those embodiments supporting both methods illustrated by FIG. 2-3, the embodiments may also support configuration of one of the two methods as the current operating method. The configuration may be supported in a static or dynamic approach.

For the latter embodiments, Beamforming unit 114 forms the corresponding output signals based at least in part on the DOAs of the L multipath of the J signals estimated by DOA Estimation unit 112. More specifically, Beamforming unit 114 determines a number of corresponding weights and forms the corresponding output signals based at least in part on weighted contributions of the L multipaths of the J signals estimated by DOA Estimation unit 112.

Except for the advantageous manners base station 106 acquires signals 104a–104j mobile handsets 102a–102j and RF units 110 represent a broad range of these elements. A computer system suitable for hosting a software implementation of DOA Estimation unit 112 and Beamforming unit 114 will be further described below referencing FIG. 4. The software implementation may be developed employing any one or more of a number of programming languages. However, the present invention anticipates all or portions of DOA Estimation unit 112 and Beamforming unit 114 may be implemented in hardware, using e.g. one or more Application Specific Integrated Circuit (ASIC) or Field Programmable Logic Devices. One of ordinary skill in the art would be able to do so, based on the description provided herein.

For the remaining descriptions to follow, and for the claims, the following conventions are employed:

boldface-capital letters, such as A, M, represent matrices or subspaces, boldface-small letters, such as v, represent vectors, and non-boldface letters, such as "s", represent scalars.

Referring now to FIG. 2, a flow diagram illustrating the operation flow of DOA Estimation unit 112 for determining the DOAs of the J signals in accordance with one embodiment, is shown. The embodiment assumes the followings:

The J independent signals impinge on the N antenna array in J distinct directions $\theta_1, \ldots \theta_J$, where the angles $\theta_j$ are measured with respect to the endfire direction.

The output signal vector for a single snapshot of the received signal is given by $$x(t)=As(t)+n(t) \quad (1)$$

where x(t) is the N×1 column vector written as, $$x(t)=[x_1(t), \ldots, x_L(t)]^T \quad (2)$$

$A=[a(\theta_1), \ldots a(\theta_J)]$, where A is the N×J directional response matrix (3)

$a(\theta_j)=[1e^{-ikd\cos\theta_j} \ldots e^{-i(L-1)kd\cos\theta_j}]^T$, j=1, \ldots, J (4)

are the signal directional vectors. Each $a(\theta_j)$ vector has the dimension N×1.

$s(t)=[s_1(t), \ldots, s_J(t)]^T$, s(t) is the J×1 vector that contains the J signals transmitted by J independent sources. (5)

$k=2\pi f_0/c$, $f_0$ being the center frequency, and c being speed of electromagnetic wave, k being the wavelength, and d is the spacing between antenna elements and t corresponds to the time index.

Thus, x(t) is the linear combination of J-linearly independent Vandermonde vectors, each corresponding to a source direction, and x(t) may be considered as $$x(t)=a(\theta_1)s_1(t)+ \ldots +a(\theta_J)s_J(t) \quad (6)$$

In Equation (3), matrix A represents a basis that spans a J-dimensional subspace, to which x(t) belongs. Accordingly, x(t) in its decomposition has one of the directional vectors as its element.

Hence, there exists a correlation such that the intersection of the one-dimensional subspace spanned by x(t) (output signal vector for a single snapshot) and any of it's J-signal directional vectors is non-zero.

Therefore, if $\theta_i$ does not correspond to one of true source directions i.e. $\theta_i \notin (\theta_1, \ldots, \theta_J)$, the intersection between x(t) and $a(\theta_i)$ will be zero.

Accordingly, the computational problem is formulated as $$x(t) \cap a(\theta_i)=0, \text{ for } \theta_i \notin (\theta_1, \ldots, \theta_J) \quad (7)$$

$$x(t) \cap a(\theta_i) \neq 0, \text{ for } \theta_i \in (\theta_1, \ldots, \theta_J) \quad (8)$$

The N×2-matrix formulated as $D(t)=[x(t),a(\theta_i)]$ will have rank deficiency or close to rank deficiency if $\theta_i \in (\theta_1, \ldots, \theta_J)$.

Hence, in determining the DOA of the J signals $\theta_1, \ldots \theta_J$, the process of FIG. 2 first selects a trial direction for a signal source j, $\sim\theta_i$, block 202.

On selecting a trial direction, the process proceeds to compute a first coefficient (9a) $r_{11}=\|x(t)\|$, and a first orthonormal vector (9b)

$$q_1 = \frac{x(t)}{r_{11}},$$

block 204.

On computing the first coefficient and the first orthonormal vector, the process proceeds to compute a second coefficient (10a) $r_{12}=q_1^H a(\sim\theta_i)$, a second orthonormal vector (10b) $q_2=a(\sim\theta_i)-r_{12}q_1$, and a third coefficient (10c) $r_{22}=\|q_2^H a(\sim\theta_i)\|$, block 206.

Then, the process proceeds to evaluating a function $$B(\theta) = \frac{1}{r_{22}} \text{ for } \sim \theta_i, \text{ and} \tag{11}$$

determines whether the evaluation yields a peak value for the function. If so, the trial direction is considered to be one of the DOAs of the J signals.

At block 210, the process determines whether additional directions are to be determined. If so, the process returns to block 202, and continues from there as earlier described. If not, the process terminates.

Referring now to FIG. 3, a flow diagram illustrating the operation flow of DOA Estimation unit 112 for determining the DOA of L coherent multipaths of J signals in accordance with one embodiment, is shown. The embodiment includes an initial determination of the DOAs of the J signals, and the determined DOA of the J signals are then employed, along with other information, to determine the DOAs of the L multipaths of the J signals.

The signal corresponding to jth source and L coherent multipaths at the base station is given by $$x_j(t) = \sum_{l=1}^{L} R_{jl} e^{i2\pi(f_d \cos\theta_{jl} - f\tau_{jl})} s(t - \tau_{jl}). \tag{12}$$

Extending the above equation for N-element antenna array, the following relationship is obtained.

$$x_j(t) = \sum_{l=1}^{L} v(\theta_{jl}) R_{jl} e^{i2\pi(f_d \cos\theta_{jl} - f\tau_{jl})} s(t - \tau_{jl}), \tag{13}$$

where $$v(\theta_{jl}) = \begin{bmatrix} 1 & e^{\frac{-i2\pi \cos\theta_{jl}}{\lambda}} & e^{\frac{-i4\pi \cos\theta_{jl}}{\lambda}} & \ldots & e^{\frac{-i2\pi(N-1)\cos\theta_{jl}}{\lambda}} \end{bmatrix}^T$$

is the array response vector for jl-th multipath component. The notations in the above have the following meanings.

$R_{jl}$ in the signal strength or amplitude of the l'th multipath.

$f_d \cos\theta_{jl}$ is the Doppler shift of the jl'th multipath, $\tau_{jl} = r_{jl}/c$ is the time delay of the of the jl-th multipath, $r_{jl}$ is the range of the jl-th multipath, and c is the speed of electromagnetic wave, $\theta_{jl}$ is DOA corresponding to jl-th multipath.

L is the number of dominant multipaths for j-th source.

Under the assumption that multipath delay spread $$T = \max(\tau_{jl}) - \min(\tau_{jl}) << 1/B,$$

where B is the bandwidth of the signal, $s_j(t)$, the base band signal of the jth source can be modeled as a narrowband signal, that is, $s(t-\tau_{jl}) \approx s(t-\tau_0)$, where $\tau_0 \in [\min(\tau_i), \max(\tau_i)]$. $x_j(t)$ is also written as $$x_j(t) = \sum_{l=1}^{L} v(\theta_{jl}) R_{jl} e^{i\varphi_{jl}(t)} s(t - \tau_{jl}) \tag{14}$$

where $$\phi_{jl} = 2\pi\pi(f_d \cos\theta_{jl} - f\tau_{jl}) \tag{15}$$

Further, all multipaths from the mobile arrive at the base station array uniformly within $\pm \Delta$ around the mean angle of the arrival $\theta_j$.

Further, assuming the signals are narrowband, the complex baseband signal vector can be written as $$x_j(t) \approx s_j(t - \tau_0) \left( \sum_{l=1}^{L} v(\theta_j) R_j e^{i\varphi_{jl}(t)} \right) \tag{16}$$

Further letting $$a_j(t) = \sum_{l=1}^{L} v(\theta_j) R_{jl} e^{i\varphi_{jl}(t)} \tag{17}$$

be an Array Response vector for L number of coherent multipaths corresponding to j'th source.

Use of the conventional algorithms like MUSIC leads to the estimation of the same direction $\theta_j$, since all the L multipaths corresponding to that source are coherent.

Hence $\theta_{jl}$ may be replaced by $\theta_j$.

In such a case the above equation can be approximated as $$a_j(t) \approx v(\theta_j)\beta_j, \text{ where } \beta_j = \sum_{l=1}^{L} R_{jl} e^{i\varphi_{jl}(t)} \tag{18}$$

For J-users the signal vector at the array is given by $$x(t) = x_1(t) + x_2(t) + \ldots + x_j(t) = \sum_{l=1}^{L} s_j(t) a_j + n(t) \tag{19}$$

n(t) is the noise vector (column), noise is assumed to be spatially and temporally white.

$$R = E[y(t)y(t)^H] \tag{20}$$
$$= A\Phi A^H + \sigma^2 I$$

R is a correlation matrix. It is obtained from the outer-products of the received signal+noise vectors x(t) and averaged over several snapshots.

Averaging is denoted by E.

H denotes the 'Hermitian(transpose and conjugate).

A is the matrix of size N×J (N-antennas, J-sources);

$\sigma^2$ is the noise variance,

I is the N×N identity matrix and $$\Phi = E[s(t)s(t)^H] \text{ is the J×J source covariance matrix.} \tag{21}$$

s(t) is baseband signal powers lying along the diagonal elements of $\Phi$.

It's size is J×J, where J is the number of sources. Noise covariance is given by $$E[n(t)n^H(t)] = \sigma_n^2 I \qquad (22)$$

So, letting the eigenvalues of R, be arranged in descending order, and denoted by $\lambda_1 \geq \lambda_2 \geq \ldots \geq \lambda_N$, as well as letting $u_1, \ldots, u_N$ be the corresponding eigenvectors, where the eigenvalues $\lambda_n$ are given by $$\lambda_n = \begin{cases} v_n + \sigma^2 & \text{for } n = 1, \ldots K \\ \sigma^2 & \text{for } n = K+1, \ldots N \end{cases} \qquad (23)$$

$U_s = [u_1, \ldots, u_J]$ may be considered as the signal subspace, and
$U_n = [u_{J+1}, \ldots, u_N]$ may be considered as the noise subspace.

$U_n v(\theta_j) = 0$ for $j=1, \ldots, J$, and elsewhere $U_n v(\theta_j) \neq 0$.

The embodiment assumes that the subspace spanned by the estimated eigenvectors $U_s = [u_1, \ldots, u_J]$ corresponds to the space spanned by the J-true source directions. It should be noted that j-th eigenvector corresponds to L-coherent multipaths due to the j-th source. Estimation of the j-th source direction $\theta_j$ can be done by any well known method like MUSIC. The embodiment searches within the direction range $\theta_j \pm \Delta$, centered on the determined DOA of the j-th source $\hat{\theta}_j$, to determine the L multipaths for j-th source.

Thus, signal vector $x_j(t)$ can be considered as $$x_j(t) = [v(\theta_{j1}) v(\theta_{j2}) \ldots v(\theta_{jL})] \tilde{s}_{jl}$$

where $\tilde{s}_{jl} = R_{jl} e^{i2\pi(f_d \cos\theta_{jl} - f \tau_{jl})} s_j(t - \tau_{jl})$ (24)

$$x_j(t) \in \text{span}\{v(\theta_{j1}), \ldots, v(\theta_{jL})\}. \qquad (25)$$

Thus, as illustrated in FIG. 3, the process for searching for the set $\Theta_j = (\theta_{j1}, \theta_{j2}, \ldots, \theta_{jL})$ where $\theta_{jl} \in (\theta_j \pm \Delta)$, l=1, 2, ..., L, starts with the process first selecting a trial direction set $\Theta = (\theta_{jk_1}, \theta_{jk_2}, \ldots, \theta_{jk_L})$ for L multipaths of the jth source, block 302.

The processing of finding $\Theta = \Theta_j$, that is, $(\theta_{jk_1}, \theta_{jk_2}, \ldots, \theta_{jk_L}) = (\theta_{j1}, \theta_{j2}, \ldots, \theta_{jL})$ is explained as follows.

First, the process selects randomly a set $(\theta_{jk_1}, \theta_{jk_2}, \ldots, \theta_{jk_L})$ Second, the process forms the following matrix
$D(\theta) = [v(\theta_{jk_1}) v(\theta_{jk_2}) \ldots v(\theta_{jk_L}) u_j]$ where $\theta_{jk_i} \in (\theta_j \pm \Delta)$ Third, the process computes the following relationships $$r_{11} = \|v(\theta_{jk_1})\|_2, \text{ and} \qquad (26)$$

$$q_1 = \frac{v(\theta_{jk_1})}{r_{11}}, \qquad (27)$$

block 304.

$\|.\|_2$ is the 2-norm of the vector.

Similarly, for following coefficients and vectors, the process computes $$r_{il} = q_i^H v(\theta_{jk_l}); \ 1 \leq i \leq l-1; \ l=2, \ldots, L+1 \qquad (28)$$

$$r_{il} = \left\| v(\theta_{jk_l}) - \sum_{i=1}^{l-1} r_{il} q_i \right\|_2,$$

$l=2, \ldots, L+1$, and (29)

$$q_l = \left[ v(\theta_{jk_l}) - \sum_{i=1}^{l-1} r_{il} q_i \right] / r_{il}, \ l=2, \ldots, L+1, \qquad (30)$$

$l=2, \ldots L+1$, block 306. The computation is performed until $l=L+1$, that is obtaining $r_{L+1,L+1}$.

Then, at block 308, the process computes the function $$B(\Theta_j) = \frac{1}{r_{L+1,L+1}}. \qquad (31)$$

If the result of $B(\Theta_j)$ yields a "new" set of peak values, the trial direction set $\Theta$ is set as the directions of arrival of the L strong multipaths.

At block 310, a determination is made whether the process is to be repeated. The number of trials to repeat may be predetermined, for operating efficiency, or based on a predetermined threshold of diminishing marginal improvements.

If another trial set is to be evaluated, the process returns to block 302.

Eventually, the criteria to terminate estimation process is met, and the process terminates. The then current estimates of the L multipath directions $\hat{\Theta}_j = \{\hat{\theta}_{j1}, \ldots, \hat{\theta}_{jL}\}$ are used to obtain the combined signal z(t) (See FIG. 1) as $$z(t) = \sum_{l=1}^{L} \sum_{n=1}^{N} x_n w_{nl} \text{ where } w_{nl} = e^{-ikd(n-1)\cos\hat{\theta}_{jl}} \qquad (32)$$

In other words, after estimation of the L-multipath directional set in DOA Estimation Unit 112 for j-th source, the received signals at the antenna elements are appropriately weighted as given in the equation (32).

This process is repeated for all J signal sources received at the antenna elements with each source signal weighted by coefficients corresponding to L-multipaths.

Figure 4:
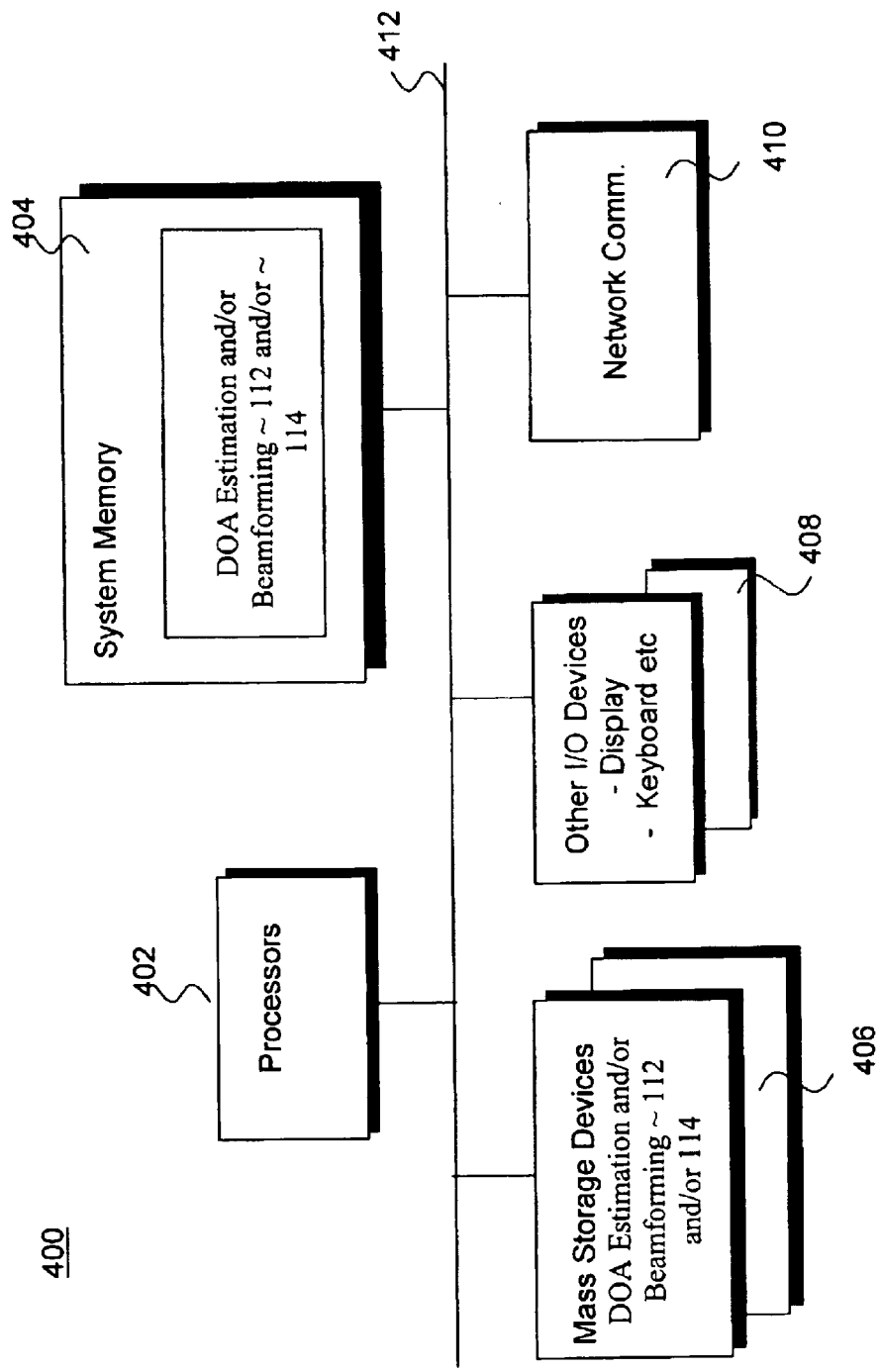
FIG. 4 illustrates a computer system suitable for use to practice one or more aspects of one or more of the signal processing methods of FIG. 2-3, in accordance with one embodiment.

Referring now to FIG. 4, a block diagram illustrating an example computer system suitable for hosting a software implementation of the DOA Estimation unit 112 and Beamforming unit 114, is shown. As illustrated, computing device 400 includes one or more processors 402, system memory 404, mass storage devices 406, other I/O devices 408 and network communication interface 410, coupled to each other via system bus 412 as shown.

Processor 402 is employed to execute software implementations of DOA Estimation 112 and/or Beamforming 114. Processor 402 may be any one of a number of processors known in the art or to be designed. Examples of suitable processors include but are not limited microprocessors available from Intel Corp of Santa Clara, Calif.

System memory 404 is employed to store working copies of Estimation 112 and/or Beamforming 114 and operating system services. System memory 404 may be Dynamic Random Access Memory (DRAM), Synchronous DRAM (SDRAM) or other memory devices of the like.

Mass storage devices 406 are employed to persistently store data, including e.g. a persistent copy of Estimation 112 and/or Beamforming 114. Examples of mass storage devices 406 include but are not limited to hard disks, CDROM, DVDROM, and so forth.

Other I/O devices 408 are employed to facilitate other aspects of input/output. Examples of other I/O devices 408 include but are not limited to keypads, cursor control, video display and so forth.

Network communication interface 410 is employed to facilitate network communication with other devices. Network communication interface 410 may be wired based or wireless. In various embodiments, network communication interface 410 may support any one of a wide range of networking protocols.

In alternate embodiments, computing system may be a multi-processor systems, a cluster of networked computers, including an array of massively parallel computing nodes.

Accordingly, various novel methods and apparatus for determining the DOA of J signals, and/or determining the DOA of L multipaths of J signals, the J signals being wireless transmitted by their sources.

While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. In a system, a method of operation comprising:
   receiving a plurality of signals wireless transmitted by a plurality of signal sources, employing a plurality of sensors;
   determining a direction of arrival for a first signal of the plurality signals;
   determining a first plurality of directions of arrival for a first plurality of multipaths of the first signal, including searching for the first plurality of directions of arrival for the first plurality of multipaths of the first signal in a direction range centered on the determined direction of arrival of the first signal; and
   obtaining the first signal based at least in part on the determined first plurality of directions of arrival for the first plurality of multipaths of the first signal.

2. The method of claim 1, wherein
   the method further comprises determining a correlation matrix for the signals, and determining a plurality of eigenvectors of the correlation matrix corresponding to the signals; and
   said determining of the direction of arrival of the first signal is performed based at least in part on the determined eigenvectors of the correlation matrix corresponding to the signals.

3. The method of claim 2, wherein said determining of the correlation matrix comprises averaging a plurality of sets of outer-products of a plurality of signal plus noise vectors determined based on a plurality of corresponding snapshots of the signals sensed by the sensors.

4. The method of claim 1, wherein
   said receiving of a plurality of signals comprises receiving J signals wirelessly transmitted by J signal sources, employing N sensors, where J and N are integers, each greater than 1;
   the jth transmitted signal is modeled as $x_j(t)=s_j(t)e^{j(2\pi(2+\phi_0))}$, s(t) being a base band signal, and $\phi_0$ being an initial phase; and
   the received jth signal is given by $$x_j(t) = \sum_{l=1}^{L} R_{jl} e^{i2\pi(f_d \cos\theta_{jl} - f\tau_{jl})} s(t - \tau_{jl})$$

where Rjl is the signal strength of the l'th multipath of the j'th signal,
   $f_d \cos\theta_{jl}$ is the Doppler shift of the l'th multipath of the j'th signal,
   $f$ is a carrier frequency,
   s( ) is a base band signal,
   $\tau_{jl} = r_{jl}/c$ is the time delay of the l'th multipath of the j'th signal,
   $r_{jl}$ is the range of the l'th multipath of the j'th signal,
   c is the speed of Electromagnetic wave, and
   $\theta_{jl}$ is the direction of arrival of the l'th multipath of the j'th signal.

5. The method of claim 4, wherein
   a response vector at the N sensor for a signal impinging from an angle $\theta$ is given by $$v(\theta_{jl}) = \left[ 1 \quad e^{\frac{-i2\pi \cos\theta_{jl}}{\lambda}} \quad e^{\frac{-i4\pi \cos\theta_{jl}}{\lambda}} \quad \ldots \quad e^{\frac{-i2\pi(N-1)\cos\theta_{jl}}{\lambda}} \right]^T;$$

and a baseband signal vector corresponding to the l'th multipath of the j'th signal impinging from an angle $\theta_{jl}$ is given by $$x_j(t) = \sum_{l=1}^{L} v(\theta_{jl}) R_{jl} e^{i2\pi(f_d \cos\theta_{jl} - f\tau_{jl})} s(t - \tau_{jl}).$$

6. The method of claim 5, wherein said searching comprises computing for a search vector $\{v(\theta_{jk_1}), v(\theta_{jk_2}), \ldots, v(\theta_{jk_L})\}$, $\theta_{jk_1}$ being a search angle, $$r_{11} = \|v(\theta_{jk_1})\|_2 \text{ and}$$

$$q_l = \frac{v(\theta_{jk_1})}{r_{1l}}$$

$\|\cdot\|_2$ is the 2-norm of the vector.

7. The method of claim 6, wherein said searching further comprises computing $$r_{il} = q_i^H v(\theta_{jk_l}); \quad 1 \leq i \leq l-1; \quad l=2, \ldots, L+1$$

$$r_{il} = \left\| v(\theta_{jkl}) - \sum_{i=1}^{l-1} r_{il} q_i \right\|_2, \quad l = 2, \ldots, L+1, \text{ and}$$

$$q_i = \left[ v(\theta_{jkl}) - \sum_{i=1}^{l-1} r_{il} q_i \right] / r_{il}, \quad l = 2, \ldots, L+1.$$

8. The method of claim 7, wherein said searching further comprises determining whether a function $$B(\Theta_j) = \frac{1}{r_{L+1,L+1}}$$

yields a peak value, and if so, setting $\Theta_j = \{\theta_{j1}, \ldots, \theta_{jL}\}$ as the first directions of arrival of the first plurality of multipaths of the first signal.

9. The method of claim 1, wherein said obtaining of the first received signal comprises obtaining z(t) based on the determined directions of arrival of L-multipaths of the first receiving signal as follows $$z(t) = \sum_{l=1}^{L} \sum_{n=1}^{N} x_n w_{nl} \text{ where } w_{nl} = e^{-ikd(n-1)\cos\theta_{jl}}.$$

10. An apparatus comprising:
   storage medium having a plurality of programming instructions designed to enable the apparatus to
      determine a direction of arrival for a first signal of a plurality of signals received employing a plurality of sensors, the signals being wirelessly transmitted by a plurality of signal sources, and,
      determine a first plurality of directions of arrival for a first plurality of multipaths of the first signal, including searching for the first plurality of directions of arrival for the first plurality of multipaths of the first signal in a direction range centered on the determined direction of arrival of the first signal, and
      obtain the first signal based at least in part on the determined first plurality of directions of arrival for the first plurality of multipaths of the first signal; and
   at least one processor coupled to the storage medium to execute the programming instructions.

11. The apparatus of claim 10, wherein
   the programming instructions are further designed to enable the apparatus to determine a correlation matrix for the signals, and determine a plurality of eigenvectors of the correlation matrix corresponding to the signals; and
   the programming instructions are designed to perform said determining of the direction of arrival of the first signal, based at least in part on the determined eigenvectors of the correlation matrix corresponding to the signals.

12. The apparatus of claim 11, wherein the programming instructions are designed to perform said determining of the correlation matrix by averaging a plurality of sets of outer-products of a plurality of signal plus noise vectors determined based on a plurality of corresponding snapshots of the signals sensed by the sensors.

13. The apparatus of claim 10, wherein
   said receiving of a plurality of signals comprises receiving J signals wirelessly transmitted by J signal sources, employing N sensors, where J and N are integers, each greater than 1;
   the jth transmitted signal is modeled as $x_j(t) = s_j(t)e^{j(2\pi(2+\phi_0))}$, s(t) being a base band signal, and $\phi_0$ being an initial phase; and
   the received jth signal is given by $$x_j(t) = \sum_{l=1}^{L} R_{jl} e^{i2\pi(f_d \cos\theta_{jl} - f\tau_{jl})} s(t - \tau_{jl})$$

where Rjl is the signal strength of the l'th multipath of the j'th signal, $f_d \cos\theta_{jl}$ is a Doppler shift the l'th multipath of the j'th signal, $f$ is a carrier frequency, $s(\ )$ is a base band signal, $\tau_{jl} = r_{jl}/c$ is a time delay of the l'th multipath of the j'th signal, $r_{jl}$ is the range of the l'th multipath of the j'th signal, c is speed of Electromagnetic wave, and $\theta_{jl}$ is the direction of arrival of the l'th multipath of the j'th signal.

14. The apparatus of claim 13, wherein
   a response vector at the N sensor for a signal impinging from an angle $\theta$ is given by $$v(\theta_{jl}) = \begin{bmatrix} 1 & e^{\frac{-i2\pi \cos\theta_{jl}}{\lambda}} & e^{\frac{-i4\pi \cos\theta_{jl}}{\lambda}} & \ldots & e^{\frac{-i2\pi(N-1)\cos\theta_{jl}}{\lambda}} \end{bmatrix}^T;$$

and a baseband signal vector corresponding to the l'th multipath of the j'th signal impinging from an angle $\theta_{jl}$ is given by $$x_j(t) = \sum_{l=1}^{L} v(\theta_{jl}) R_{jl} e^{i2\pi(f_d \cos\theta_{jl} - f\tau_{jl})} s(t - \tau_{jl}).$$

15. The apparatus of claim 14, wherein the programming instructions are designed to perform as part of said searching, computation for a search vector $\{v(\theta_{jk_1}), v(\theta_{jk_2}), \ldots, v(\theta_{jk_L})\}$, $\theta_{jk_1}$ being a search angle, $$r_{11} = \|v(\theta_{jk_1})\|_2 \text{ and}$$

$$q_l = \frac{v(\theta_{jk_1})}{r_{1l}}$$

$\|.\|_2$ is the 2-norm of the vector.

16. The apparatus of claim 15, wherein the programming instructions are designed to perform as part of said searching, computation of $$r_{11} = q_i^H v(\theta_{jk_l}); \ 1 \leq i \leq l-1; \ l = 2, \ldots, L+1$$

$$r_{ll} = \left\| v(\theta_{jkl}) - \sum_{i=1}^{l-1} r_{il} q_i \right\|_2, \ l = 2, \ldots, L+1, \text{ and}$$

$$q_i = \left[ v(\theta_{jkl}) - \sum_{i=1}^{l-1} r_{il} q_i \right] / r_{ll}, \ l = 2, \ldots, L+1.$$

17. The apparatus of claim 16, wherein the programming instructions are designed to perform as part of said searching, determination of whether a function $$B(\Theta_j) = \frac{1}{r_{L+1,L+1}}$$

yields a peak value, and if so, set $\Theta_j = \{\theta_{j1}, \ldots, \theta_{jL}\}$ as the first directions of arrival of the first plurality of multipaths of the first signal.

18. The apparatus of claim 10, wherein the programming instructions are designed to perform said obtaining of the first received signal by obtaining z(t) based on the determined directions of arrival of L-multipaths of the first received signal as follows $$z(t) = \sum_{l=1}^{L} \sum_{n=1}^{N} x_n w_{nl} \text{ where } w_{nl} = e^{-ikd(n-1)\cos\hat{\vartheta}_{jl}}.$$

19. A system comprising:
a plurality of antennas to receive a plurality of signals wirelessly transmitted by a plurality of signal sources;
a RF unit coupled to the antennas to down convert the received signals; and
a direction of arrival estimation unit coupled to the RF unit, to
determine a direction of arrival for a first signal of a plurality of received signals wireless transmitted by a plurality of signal sources,
determine a first plurality of directions of arrival for a first plurality of multipaths of a first of the first signal, including searching for the first plurality of directions of arrival for the first plurality of multipaths of the first signal in a direction range centered on the determined direction of arrival of the first signal, and
obtain the first signal based at least in part on the determined first plurality of directions of arrival for the first plurality of multipaths of the first signal.

20. The system of claim 19, wherein the direction of arrival estimation unit further
determines a correlation matrix for the signals, and determines a plurality of eigenvectors of the correlation matrix corresponding to the signals; and
determines the the direction of arrival of the first signal, based at least in part on the determined eigenvectors of the correlation matrix corresponding to the signals.

21. The system of claim 20, wherein the direction of arrival estimation unit determines the correlation matrix by averaging a plurality of sets of outer-products of a plurality of signal plus noise vectors determined based on a plurality of corresponding snapshots of the received signals.

22. An article of manufacture, comprising:
a machine readable medium having stored therein a plurality of programming instructions designed to enable an apparatus to
determine a direction of arrival for a first signal of a plurality of signals wireless transmitted by a plurality of signal sources,
determine a first plurality of directions of arrival for a first plurality of multipaths of a first of the first signal, including searching for the first plurality of directions of arrival for the first plurality of multipaths of the first signal in a direction range centered on the determined direction of arrival of the first signal, and
obtain the first signal based at least in part on the determined first plurality of directions of arrival for the first plurality of multipaths of the first signal.

* * * * *